United States Patent Office 3,702,771
Patented Nov. 14, 1972

3,702,771
HARD PITCH BINDERS
Lloyd H. Brown, Crystal Lake, and David D. Watson, Barrington, Ill., assignors to The Quaker Oats Company, Chicago, Ill.
No Drawing. Filed Aug. 20, 1970, Ser. No. 65,704
Int. Cl. C04b 35/66, 35/68, 35/70
U.S. Cl. 106—55                                    5 Claims

ABSTRACT OF THE DISCLOSURE

This invention provides a novel acid cured furan based binder which is a liquid at 25° C., which is useful for binding substantially non-alkaline aggregate such as carbon and graphite, and which is cured at room temperature to a thermoset condition. The hard pitch binder comprises 50 to 75 percent by weight hard pitch with a softening point between 110° C. and 180° C. and 50 to 25 percent by weight plasticizer which comprises furfuryl alcohol; furfural; and a member selected from the group consisting of cyclohexanone, mesityl oxide, and mixture thereof.

BACKGROUND OF THE INVENTION

Field of the invention

This invention relates to a hard pitch binder for non-alkaline aggregate such as carbon and graphite.

More particularly this invention relates to a hard pitch binder comprising 50 to 75 percent by weight hard pitch with a softening point between 110° C. and 180° C. and 50 to 25 percent by weight plasticizer which comprises furfuryl alcohol; furfural; and a member selected from the group consisting of cyclohexanone, mesityl oxide, and mixtures thereof.

Description of the prior art

Conventional binders for joining carbon and graphite are prepared from pitch; pitch mixed with a volatile diluent; and from furan based resins such as catalyzed furfural and pitch; furfural, furfuryl alcohol, and pitch; and furfural, pitch, and a member selected from the group consisting of phenol, cyclohexanone, and compounds of the formula $CH_3$—CO—R wherein R is aliphatic.

Conventional pitch binders are mixed with carbon; the mixture shaped by extrusion from a die is then pyrolyzed. One characteristic of pitch is that on heating it goes through a liquid stage in which volatiles are given off and on further heating turns slowly to a viscous liquid and finally into carbon. The softening of the pitch during heating causes the carbon article to slump, and the loss of volatile constituents reduces the amount of carbon yield from the pitch and reduces the density of the finished article. Further the volatile constituents often cause the article to swell during pyrolysis which results in the deformation and cracking of the carbon article.

It is well known that pitch having a relatively high melting point such as those used in the binder of this invention contains less volatile matter than pitch having a softening point of 100° C. or less which is conventionally used in the manufacture of carbon articles.

In the manufacture of carbon articles—particularly graphite articles—it is further well known that electrical conductivity and strength is strongly dependent upon the density of the carbon article. Thus as density increases conductivity and strength increases. It is, therefore, highly desirable to produce as dense a carbon article as possible.

It is still further well known that the carbon yield from pitch is directly related to softening point. For example, a pitch (90° C. to 100° C.) will typically have a carbon yield on pyrolysis of 40 to 50 percent whereas the preferred binders of this invention have carbon yields above 65 percent. Higher carbon yields can be achieved with conventional pitch binders by use of higher softening point pitches, but mixing and molding operations become progressively more difficult as the temperature is raised. It has, therefore, long been regarded as desirable to produce a fluid binder from high melting pitch. A satisfactory plasticizer for pitch has long been sought. Hereinbefore no plasticizer has been prepared which provides a hard pitch binder which is at the same time a liquid at room temperature, which is cured at room temperature, which is compatible down to the temperature at which it becomes a solid, and which is thermosetting.

Volatile diluents have been used as plasticizers for pitch. Conventional pitch binders with volatile diluents suffer all the shortcomings of conventional pitch binders. These binders are applied to carbon and heated moderately to drive off the volatile diluent. They have the disadvantages of softening when heated substantially above the melting point of pitch and losing their strength, of cracking and swelling due to the loss of volatiles on heating, and of providing low carbon yield and low density carbon articles on pyrolysis.

Conventional furan based resin binders from furfural as plasticizer have been prepared consisting essentially of furfural, between about 10 and 70 percent by weight of coal tar pitch having a melting point below 110° C., and an acid catalyst in an amount which provides thermosetting of the liquid upon heating. Several disadvantages of this binder are that only low softening point pitches can be used and that the binder must be heated to be cured.

Binders made from high melting pitches having softening points over 150° C. with a plasticizer containing furfural, furfuryl alcohol, and mixtures are known in the art. These binders, unlike the hard pitch binders of this invention, are not all liquid at room temperature.

Binders comprising high melting point pitch plasticized with furfural and a member selected from the group consisting of phenol, cyclohexanone, and compounds of the formula $CH_3$—CO—R wherein R is aliphatic have been prepared. One disadvantage of these binders is that they are not all liquid at room temperature. A further disadvantage is that they suffer greater weight loss when cured at temperatures above room temperature than the hard pitch binders of the present invention.

SUMMARY OF THE INVENTION

It is an object of this invention to provide a hard pitch binder which is readily cured at room temperature, suffers low weight loss of volatile matter when cured at a higher temperature, and gives high carbon yield when pyrolyzed.

It is another object of this invention to provide a binder which when used with carbon reduces losses during pyrolysis due to cracking or swelling of the carbon article.

It is another object of this invention to provide a binder which is a liquid at 25° C., which possesses the property of excellent wettability of the aggregate, and which is compatible down to the temperature at which it becomes a solid.

It is yet another object of this invention to provide a hard pitch binder for carbon, graphite, and other substantially non-alkaline aggregates such as magnesite which has high strength upon curing at room temperatures and which retains its strength at high tempertaures without slumping.

It is a further object of this invention to provide a thermosetting binder.

These objects are accomplished by a binder for refractory aggregate selected from the group consisting of neutral aggregate, acidic aggregate, and weak basic aggregate comprising 50 to 75 percent by weight hard pitch having a softening point between 110° C. and 180° C. and 50 to 25 percent by weight plasticizer which comprises furfuryl alcohol; furfural; and a member selected from the group consisting of cyclohexanone, mesityl oxide, and mixtures thereof.

The hard pitch binder of this invention is prepared by a method which comprises (a) blending 50 to 75 percent by weight hard pitch having a softening point between 110° C. and 180° C.; furfural; furfuryl alcohol; and a member selected from the group consisting of cyclohexanone, mesityl oxide, and mixtures thereof; said furfural; said furfuryl alcohol; and said member selected from the group consisting of cyclohexanone, mesityl oxide, and mixtures thereof comprising 50 to 25 percent by weight of the hard pitch binder; and (b) heating the blended mixture to solubilize the hard pitch whereby a hard pitch binder is produced which is a liquid at 25° C. and which is compatible down to the temperature at which it becomes a solid.

It is to be understood that by compatibility we mean that the hard pitch binders of this invention do not separate into separate phases down to the temperature at which the binders become solids.

No conventional binder possesses the combination of desirable properties of the binder of this invention. The hard pitch binders of this invention have the following properties among others: liquidity at room temperature, excellent wettability of refractory aggregate, acid curability at room temperature, and compatibility down to the temperature at which it becomes a solid. Furthermore, our binders are thermosetting on cure.

The pitches used in the binder of the present invention are coal tar pitches and petroleum pitches having a softening point between 110° C. and 180° C. as measured by the ring and ball method of ASTM Test D36–64T. Preferably the pitch used in the binder of this invention should be relatively free of volatile constituents and have a solubility in quinoline between 75 and 98 percent. Binders of this invention cannot be made with pitches having a softening point higher than 180° C. A binder made with a pitch having a softening point higher than 180° C. is not compatible whereas all the binders of this invention are compatible down to the temperature at which they become solids. Binders made with pitches having a softening point below 110° C. when pyrolyzed do not give a carbon yield which is high enough for a commercially competitive binder.

It is essential that the binders of this invention contain 50 to 75 percent by weight hard pitch and 50 to 25 percent by weight plasticizer which comprises furfuryl alcohol; furfural; and a member selected from the group consisting of cyclohexanone, mesityl oxide, and mixtures thereof. A binder made with below 50 percent by weight hard pitch is not compatible and not a binder of this invention. A binder made with more than 75 percent hard pitch has very high viscosity or is a solid and is not a binder of this invention.

It is essential that there be sufficient furfuryl alcohol to provide a binder which will cure under acidic conditions at room temperature. There is a critical upper limit on the amount of furfuryl alcohol in the liquid, thermosetting, compatible binders of this invention. The upper limit on the amount of furfuryl alcohol is dependent on the amount of cyclohexanone and/or mesityl oxide as well as the softening point of the pitch, and the nature of the pitch, i.e. coal tar or petroleum pitch. This relationship is more particularly described in the examples and the exact upper limit on the amount of furfuryl alcohol in a binder of this invention comprising a given species and softening point of pitch and a given amount of cyclohexanone and mesityl oxide can be easily determined by one skilled in the art.

It is preferred that the amount of the member selected from the group consisting of cyclohexanone, mesityl oxide, and mixture thereof be the minimum amount necessary to produce the compatible binders of this invention. That amount can be easily determined by one skilled in the art. If more than the minimum amount of the member selected from the group consisting of cyclohexanone, mesityl oxide, and mixtures thereof is used, the carbon yield of the binder on pyrolysis is adversely affected.

To prepare the hard pitch binder of this invention it is essential that 50 to 75 percent by weight hard pitch having a softening point between 110° C. and 180° C. be blended with furfural; furfuryl alcohol; and a member selected from the group consisting of cyclohexanone, mesityl oxide, and mixtures thereof. The furfural; furfuryl alcohol; and the member selected from the group consisting of cyclohexanone, mesityl oxide, and mixtures thereof comprise 50 to 25 percent by weight of the binder.

To prepare the hard pitch binder of this invention it is also essential that the above blend be heated for a time and at a temperature sufficient to solubilize the hard pitch whereby a hard pitch binder is produced which is a liquid at 25° C. and which is compatible down to the temperature at which it becomes a solid. The temperature and the time necessary to solubilize the hard pitch can easily be determined by one skilled in the art.

It is preferred that the temperature of the above blend gradually be raised to 60° C. over a period of several hours. The time period over which the temperature is to be gradually raised to produce the binder of this invention is largely a function of the amount of the blend, but is also a function of the effectiveness of the stirring of the blend.

Catalysts which can be used in conjunction with the novel binder of this invention comprise strong acids or acid salts. More particularly it is essential that the catalyst is a strong acid or acid salt of a weak base which has a $K_1$ at 25° C. of at least $7.5 \times 10^{-3}$. For example, the catalyst may be phosphoric acid, sulfuric acid, hydrochloric acid, and ammonium phosphate. For most purposes 2 to 5 percent catalyst by weight of the binder has been found to be adequate. No particular benefits are obtained with the amounts of catalyst in excess of 10 percent.

A basic catalyst cannot be used to cure the binder of this invention. When a basic catalyst is used with the binder of this invention, the binder suffers too high of a weight loss of volatile material and provides too low of a carbon yield when the binder is pyrolyzed.

The binder of this invention may be used on any substantially non-alkaline aggregate and is selected from the group consisting of neutral aggregate, acidic aggregate, and weakly basic aggregate. The necessity for utilizing a relatively strong acid catalyst in order to effect complete cure places some limitations on the general applicability of the binder of this invention. That is, while aggregates such as carbon, graphite, sand and magnesite can be used with the novel binder of this invention, aggregates such as dolomite or concrete cannot be used. The acid has a deteriorating action on the alkaline aggregate or the basicity of the aggregate neutralizes the acid catalyst and inhibits satisfactory cure. The sizes of the particles of aggregate bound with the binder of this invention to form a a refractory article are not at all critical and may comprise any of those commonly used in the art. As an example, particle sizes may vary from pieces as large as one-half inch in cross section down to finely ground particles passing through a two-hundred mesh United States Standard Sieve. Ordinarily, particles of different sizes are jointly used as it is well known in the art. The size graduation is selected to give, upon compaction, as dense a mass as possible with a minimum of voids.

The binders of the prior art are not easily incorporated with aggregate because they are deficient in aggregate wettability and flow. The binders of this invention have superior properties of wettability and flow. In fabricating an article in accordance with the present invention, the aggregate and binder may be blended in a number of ways. The preferred method is to mix the acid catalyst and the aggregate. To this mixture, the binder is added. Another blending method is to mix the acid catalyst, binder, and aggregate all at once. For economical reasons, no more binder need be used than which effectively binds the particles one to another.

A particular advantage of the binder of this invention is that it can be mixed evenly and uniformly with the aggregate without the formation of undesirable or non-uniform clusters of materials, or of small unevenly mixed lumps or of masses unduly predominating in one or the other of the ingredients. The binder of this invention is a liquid at 25° C. and is compatible down to the temperature at which it becomes a solid. Because of these outstanding properties the binder of this invention provides excellent uniform wettability of the aggregate at room temperature. After the refractory particles and binder are blended as described, the resulting admixture may be used as such as a ramming mix or shot from a gun as practiced in the art to deposit the admixture to a point of use. Alternatively, the admixture may be used as a mortar or the admixture may be shaped as by pressure into a desired form, such as a brick.

The binder of this invention is cured at room temperature (25° C.). Articles cured by gradually raising the temperature from room temperature to 250° C. over several hours have greater "hot strength." That is, articles cured by gradually raising the temperature have greater tensile strength throughout a temperature range of the pyrolysis operation. The rate of temperature increase is largely a function of the size of the article to be cured. Large articles must be heated at a slower rate of temperature increase than small articles in order that the temperatures be uniform throughout the article and thus avoiding harmful internal stresses that are caused by uneven heating of the article.

The articles made with the binder of this invention may be pyrolyzed or graphitized by heating them to higher temperatures according to well understood procedures. For example, the heat treatment may be performed by first pyrolyzing the article at a temperature of at least 800° C. and then graphitizing the article at a temperature of at least 2600° C.

The hard pitch binder of this invention is used to provide bonded refractory articles. The bonded refractory articles of this invention comprise an aggregate of refractory particles selected from the group consisting of neutral aggregate, acidic aggregate, and weakly basic aggregate; bonded into an integral shape by a refractory mix comprising a hard pitch binder comprising 50 to 75 percent by weight hard pitch having a softening point between 110° C. and 180° C. and 50 to 25 percent by weight plasticizer, said plasticizer comprising furfuryl alcohol; furfural; and a member selected from the group consisting of cyclohexanone, mesityl oxide, and mixtures thereof.

The method for forming a refractory article which comprises (a) admixing refractory particles selected from the group consisting of neutral refractory particles, acidic refractory particles, and weakly basic refractory particles, with a hard pitch binder; and with a strong acid catalyst; said hard pitch binder comprising 50 to 75 percent by weight hard pitch having a softening point between 110° C. and 180° C. and 50 to 25 percent by weight plasticizer which comprises furfuryl alcohol; furfural; and a member selected from the group consisting of cyclohexanone, mesityl oxide, and mixtures thereof; (b) forming the admixture into a desired shape; (c) curing the formed admixture at a temperature of at least 20° C.; and (d) heating the cured admixture in a non-oxidizing atmosphere to a temperature of at least 800° C. to pyrolyze said binder and form a carbon bonded refractory product. The method further comprises optionally heating the pyrolyzed admixture in a non-oxidizing atmosphere to a temperature of at least 2600° C. to graphitize said binder and form a graphitized refractory product.

As an example of an article of the invention manufactured with the binder of this invention and according to the processes of this invention, an electrode for the electrolysis of aluminum will be described in detail. It is to be understood that the description of the particular article and process is illustrative only and by no means limits the scope of the invention.

DESCRIPTION OF THE PREFERRED EMBODIMENTS

The following preferred embodiments of the invention are shown for the purpose of illustrating this invention and demonstrating the best mode for practicing the invention. It will be apparent to those skilled in the art that various changes and modifications may be made therein without departing from the spirit and scope of the invention as it is more precisely defined in the subjoined claims.

Throughout the preferred embodiments the percentage retained weight of the binder was determined by the ASTM Standard Test D–189–62 (Conradson Carbon Test) and the softening point of the hard pitch was determined by the ASTM Standard Test D–36–64T (Ring and Ball Test). Further, it is to be understood that mesh size refers to the U.S. Standard Sieve Series.

EXAMPLE 1

192 g. (2 mole) of furfural, 49 g. (0.5 mole) of furfuryl alcohol, and 98 g. (1 mole) of cyclohexanone were added to a two liter flask fitted with a stirrer. A heating mantle was used to heat the contents of the flask and 402 g. blast furnace pitch with a softening point of 150° C. was added to the flask with stirring. The blast furnace pitch was broken into flakes ¼ to ⅜ inch in thickness before adding to the flask.

The contents of the flask were heated to 70° C. and held at that temperature for one hour. 201 additional grams of blast furnace pitch in flake form were added to the flask and the contents of the flask after the addition of the pitch were heated to 90° C. and held there for one hour. The hard pitch binder formed in the flask was then cooled to 21° C. at which temperature the binder was a liquid. The binder comprised 64 percent by weight hard pitch and 36 percent by weight plasticizer which comprised 14.4 percent by weight furfuryl alcohol, 56.7 percent by weight furfural, and 28.9 percent by weight cyclohexanone.

An aggregate comprising 438 g. calcined anthracite +4 mesh, 536 g. calcined anthracite −4 to +50 mesh, and 1026 g. calcined anthracite −50 mesh was premixed in a bowl shaped Clearfield mixer. The mixer had two circular grinding wheels and a five-fingered rotating paddle. To the premixed aggregate was added 32 g. of 50 percent by weight p-toluenesulfonic acid in 35 percent by weight methyl alcohol and 15 percent by weight water, as catalyst. The aggregate and acid catalyst were mixed for five minutes by the Clearfield mixer. 320 g. of the above hard pitch binder was then added to the aggregate which had been mixed with acid catalyst. The refractory mix was then mixed for 15 minutes.

The refractory mix was then taken from the mixer and placed in a gallon jar. The jar was then rotated before taking a sample to insure a random distribution of aggregate. Approximately 250 g. of the refractory mix was taken from the jar and placed in a cylindrical mold two inches in inside diameter and ten inches in length. There was a cap on one end of the mold and a plunger was placed on the other end. The refractory mix was then molded at 5000 p.s.i. in an automated press and removed from the mold. The resultant cylinder was 2 inches in diameter and approximately 3 inches in length and had a specific gravity of 1.55.

One of the purposes of this example is to show the preferred method of making the hard pitch binders of this invention and the preferred method of making the refractory mix of this invention.

EXAMPLE 2

Following the procedure of Example 1 Molded Carbon Articles 1 and 2 of Table I were prepared. The aggregate was carbon.

The composition of the binder used in Molded Carbon Article 1 of Table I was 64 percent by weight pitch of softening point 150° C. and 36 percent by weight plasticizer, said plasticizer consisting of 56.7 percent furfural, 14.4 percent furfuryl alcohol and 28.9 percent cyclohexanone. The binder was catalyzed by 10 percent by weight of 50 percent by weight p-toluenesulfonic acid in 35 percent by weight methyl alcohol and 15 percent by weight water. In Table I below p-toluenesulfonic acid is designated PTSA.

The composition of the binder in Molded Carbon Article 2 of Table I was 64 percent by weight pitch of softening point 150° C. and 36 percent by weight plasticizer, said plasticizer consisting of 66.2 percent by weight furfural and 33.8 percent by weight cyclohexanone. The binder was catalyzed by 5 percent by weight of 50 percent by weight p-toluene sulfonic acid in 35 percent by weight methyl alcohol and 15 percent by weight water.

The percent binder weight loss of Molded Carbon Articles 1 and 2 was determined by comparing the weight of the molded carbon article before and after curing at elevated temperatures. The molded carbon article was cured by gradually raising the temperature of the catalyzed binder from room temperature to 100° C. over a period of 8 hours, then to 140° C. over a period of 2 hours, and then to 250° C. over a period of 2 hours.

TABLE I

| Molded carbon article | Catalyst | Percent binder weight loss |
| --- | --- | --- |
| 1 | PTSA | 4.73 |
| 2 | PTSA | 9.55 |

One purpose of the above example is to show that the binders of this invention which contain furfuryl alcohol are superior to pitch binders of similar composition but not containing furfuryl alcohol. The acid cured hard pitch binders of this invention suffer remarkably lower weight loss on heat curing compared to similar binders not containing furfuryl alcohol.

EXAMPLE 3

The procedure of Example 1 was followed to prepare Binders 3, 4, 5 and 6 of Table II. The binders were catalyzed by the addition of 5 percent by weight p-toluenesulfonic acid in 35 percent by weight methyl alcohol and 15 percent by weight water. Ten gram samples of the catalyzed binders were poured into 150 ml. beakers and cured by gradually raising the temperature of the catalyzed binders from room temperature to 100° C. over a period of 8 hours, then to 140° C. over a period of 2 hours, and then to 250° C. over a period of 2 hours.

TABLE II

| Binder | Softening point of hard pitch, °C. | Percent by weight FA in plasticizer | Percent by weight cyclo in plasticizer | Binder compatible? | Conradson carbon (percent retained weight) |
| --- | --- | --- | --- | --- | --- |
| 3 | 110 | 14.4 | 28.9 | Yes | 51.50 |
| 4 | 150 | 14.4 | 28.9 | Yes | 66.33 |
| 5 | 180 | 14.4 | 28.9 | No | |
| 6 | 180 | 0 | 33.8 | Yes | 72.5 |

The composition of Binders 3, 4, 5 and 6 was 64 percent by weight pitch and 36 percent by weight plasticizer. The plasticizer in Binders 3, 4 and 5 consisted of 14.4 percent by weight furfuryl alcohol (FA), 56.7 percent by weight furfural, and 28.9 percent by weight cyclohexanone (Cyclo). The plasticizer in Binder 6 consisted of 66.2 percent by weight furfural and 33.8 percent by weight cyclohexanone.

Binder 5 comprising a hard pitch with a softening point of 180° C. was not campatible and separated into two layers. It is essential that the binders of this invention which are compatible be made with pitches having a softening point below 180° C. Binder 3 was made with a pitch having a softening point of 110° C. Binders made with pitches having a softening point below 110° C. do not have a sufficiently large percentage retained weight on pyrolysis to be of economic significance.

One of the purposes of this example is to show that the pitches used in the binders of this invention must have a softening point above 110° C. and below 180° C. to provide binders which are compatible down to the temperature at which they become a solid and give a high carbon yield on pyrolysis. It is a further purpose of this example to show that furfuryl alcohol concentrations in the binders of this invention at a given mesityl oxide and cyclohexanone concentration is influenced by the softening point of the pitch.

EXAMPLE 4

Following the procedure of Example 1, Binders 7, 8, and 9 of Table III were prepared. The binders were catalyzed by the addition of 10 percent by weight 50 percent by weight p-toluenesulfonic acid in 35 percent by weight methyl alcohol and 15 percent by weight water. Following the curing procedure of Example 3, the percent weight loss of the binder on heat curing was determined by comparing the weight of the binder before and after curing at elevated temperatures.

TABLE III

| Binder | Softening point of hard pitch | Percent weight loss of binder | Conradson carbon test (percent retained weight) |
| --- | --- | --- | --- |
| 7 | 110 | 12.03 | 51.50 |
| 8 | 120 | 11.30 | 57.20 |
| 9 | 150 | 8.59 | 66.33 |

The composition of Binders 7, 8, and 9 was 64 percent by weight pitch and 36 percent by weight plasticizer. The plasticizer consisted of 56.7 percent by weight furfural, 14.4 percent by weight furfuryl alcohol, and 28.9 percent by weight cyclohexanone.

One of the purposes of this example is to show that the carbon yield on pyrolysis of the hard pitch binders of this invention increases with the softening point of the pitch.

EXAMPLE 5

Binders 10, 11, and 12 of Table IV were prepared by the procedure of Example 1. The composition of Binder 10 was 45 percent by weight pitch and 55 percent by weight plasticizer. Binder 11 comprised 64 percent by weight pitch and 36 percent by weight plasticizer and Binder 12 comprised 80 percent by weight pitch and 20 percent by weight plasticizer.

The pitch of Binders 10, 11, and 12 had a softening point of 150° C. and the plasticizer consisted of 56.7 percent by weight furfural, 14.4 percent by weight furfuryl alcohol, and 28.9 percent by weight cyclohexanone.

The viscosity of Binders 10, 11, and 12 was determined with a Brookfield Viscometer Model No. LVF at 25° C.

TABLE IV

| Binder | Percent by weight | | Viscosity at 25° C. |
|---|---|---|---|
| | Pitch | Plasticizer | |
| 10 | 45 | 55 | Incompatible. |
| 11 | 64 | 36 | 36,000 cps. |
| 12 | 80 | 20 | Over 100,000 cps. |

One of the purposes of this example is to show that it is essential that the hard pitch binders of this invention have 50 to 75 percent by weight pitch and 50 to 25 percent by weight plasticizer.

In Binder 10 the percentage by weight pitch is 45 and the percentage by weight plasticizer was 55 and the binder is incompatible and hence not a binder of this invention. in Binder 12 the pitch comprised 80 percent by weight of the binder and the plasticizer comprised 20 percent by weight of the binder. Binder 12 was too viscous to be a liquid at 25° C. and hence is not a hard pitch binder of this invention.

EXAMPLE 6

Binders 13, 14, and 15 of Table V were prepared by the method of Example 1. Binder 13 was catalyzed by 5 percent by weight of 50 percent by weight p-toluenesulfonic acid in 35 percent by weight methyl alcohol and 15 percent by weight water. In Table V p-toluenesulfonic acid is abbreviated PTSA. Binder 14 was catalyzed by 5 percent by weight of 50 percent by weight dimethyl acid pyrophosphate in 35 percent by weight methyl alcohol and 15 percent by weight water. In Table V dimethyl acid pyrophosphate is designated DMAP. Binder 15 was catalyzed by 5 percent by weight furural dianiline hydrochloride in 35 percent by weight methyl alcohol and 15 percent by weight water. In Table V furfural dianiline hydrochloride is abbreviated FDAH. The percentage weight loss of the binder on heat curing was determined by curing using the procedure of Example 3 and by comparing the weight of the binder before and after curing at elevated temperatures.

The composition of Binders 13, 14, and 15 was 64 percent by weight pitch of softening point 150° C. and 36 percent by weight plasticizer, said plasticizer consisting of 56.7 percent by weight furfural, 14.4 percent furfuryl alcohol, and 28.9 percent by weight cyclohexanone.

TABLE V

| Binder | Catalyst | Percent wt. loss of binder | Conradson carbon test (percent retained weight) |
|---|---|---|---|
| 13 | PTSA | 8.59 | 66.33 |
| 14 | DMAP | 11.92 | 67.72 |
| 15 | FDAH | 11.55 | 64.36 |

This example shows among other things that the hard pitch binders of this invention are catalyzed by a strong acid catalyst having a $K_1$ at 25° C. of at least $7.5 \times 10^{-3}$.

EXAMPLE 7

Binders 16 and 17 of Table VI were prepared by the procedure of Example 1. Binder 16 was catalyzed by 6.5 percent by weight $Ca(OH)_2$ and 0.65 percent by weight NaOH. Binder 17 was catalyzed by 10 percent by weight of 50 percent by weight p-toluenesulfonic acid in 35 percent by weight methyl alcohol and 15 percent water. In Table VI p-toluenesulfonic acid is designated PTSA. The percent weight loss of binders was determined by using the curing method of Example 3 and by comparing the weight of the binder before and after curing at elevated temperatures.

The composition of Binders 16 and 17 was 64 percent by weight pitch of softening point 150° C. and 36 percent by weight plasticizer. The plasticizer consists of 14.4 percent by weight furfuryl alcohol, 56.7 percent by weight furfural, and 28.9 percent by weight cyclohexanone.

TABLE VI

| Binder | Catalyst | Percent wt. loss of binder | Conradson carbon test (percent retained weight) |
|---|---|---|---|
| 16 | Ca(OH)$_2$—NaOH | 9.78 | 60.57 |
| 17 | PTSA | 8.59 | 66.33 |

This example shows among other things that the binders of this invention are acid catalyzed. Binder 16 which was base catalyzed suffered a greater weight loss on heat cure and provided a lower carbon yield on pyrolysis than Binder 17 which was acid cured.

EXAMPLE 8

Binders 18 through 23 inclusive of Table VII were prepared by the method of Example 1 and all the binders were catalyzed with 10 percent by weight of 50 percent by weight p-toluenesulfonic acid in 35 percent by weight methyl alcohol and 15 percent by weight water. All the binders were cured by the procedure of Example 3. The composition of all the binders was 64 percent by weight blast furnace pitch and 36 percent by weight plasticizer. The plasticizer consisted of furfuryl alcohol, furfural, cyclohexanone, and mesityl oxide. In Table VII the following chemicals are abbreviated respectively FA, FCHO, Cyclo and MO: furfuryl alcohol, furfural, cyclohexanone and mesityl oxide.

TABLE VII

| Binder | Percent of weight of the plasticizer | | | | Binder compatible? | Conradson carbon test (percent retained weight) |
|---|---|---|---|---|---|---|
| | FA | FCHO | Cyclo | MO | | |
| 18 | 5.2 | 20.4 | 10.4 | 0 | Yes | 66.6 |
| 19 | 6.1 | 17.8 | 12.1 | 0 | Yes | 57.7 |
| 20 | 9.1 | 17.8 | 9.1 | 0 | No | |
| 21 | 9.1 | 17.8 | 4.55 | 4.55 | Yes | 64.1 |
| 22 | 9.1 | 17.8 | 0 | 9.1 | Yes | 66.1 |
| 23 | 12.8 | 15.4 | 3.1 | 4.75 | No | |

One of the purposes of this example is to show that the furfuryl alcohol concentration of the novel binders of this invention is a function of the cyclohexanone and mesityl oxide concentration, particularly of the mesityl oxide concentration at the higher end of the furfuryl alcohol range of concentrations. A further purpose is to show that there is a critical range of furfuryl alcohol concentration for a hard pitch of a given melting point and of a given species, that is, coal tar pitch or petroleum pitch.

EXAMPLE 9

Binders 24 and 25 of Table VIII were prepared according to the procedure of Example 1. The binders comprise furfuryl alcohol (FA), furfural (FCHO), cyclohexanone (Cyclo), mesityl oxide (MO), and pitch of softening point 150° C.

Binders 24 and 25 consist of the same amounts of furfural, furfuryl alcohol, cyclohexanone, mesityl oxide, and pitch. The only difference between these two binders is that Binder 24 contains petroleum pitch and Binder 25 contains blast furnace pitch. Binder 25 is not a compatible binder and is not a binder of this invention. The amount of furfuryl alcohol in Binder 25 exceeds the critical amount which can be in a binder containing blast furnace pitch of melting point 150° C. but the amount of furfuryl alcohol does not exceed the critical amount in Binder 24 wherein the pitch is petroleum pitch of softening point 150° C.

TABLE VIII

| Binder | Pitch | Percentage by weight of the plasticizer | | | | Binder compatible? | Conradson carbon test (percent retained weight) |
| --- | --- | --- | --- | --- | --- | --- | --- |
| | | FA | FCHO | Cyclo | MO | | |
| 24 | Petroleum | 10.1 | 19.8 | 5.05 | 5.05 | Yes | 57.1 |
| 25 | Blast furnace | 10.1 | 19.8 | 5.05 | 5.05 | No | |

This example shows among other things that the furfuryl alcohol concentration is influenced not only by the softening point of the pitch as demonstrated in Example 3, but it is also influenced by the nature of the pitch used. The critical concentration of furfuryl alcohol in the binders of this invention for a given softening point pitch depends on whether coal tar pitch or petroleum pitch is selected.

EXAMPLE 10

A cylindrical test anode specimen was molded at 5000 p.s.i. from anode aggregate (calcined anthracite +4 to −200 mesh) bonded with 16 percent by weight of Binder 1 used in Molded Carbon Article 1 in Example 2 which was catalyzed by 10 percent by weight of 50 percent by weight p-toluenesulfonic acid in 35 percent by weight methyl alcohol and 15 percent by weight water.

The specific gravity of the anode specimen was 1.50 and the compressive strength of the specimen was 2000 p.s.i. after the specimen had been heat cured as in Example 2.

From the foregoing description it is considered to be clear that the present invention contributes a substantial benefit to the art by providing a new and useful material and a method for preparing new and useful hard pitch binders.

We claim:

1. A liquid binder at 25° C. for aggregates selected from the group consisting of neutral aggregate, acidic aggregate, and weakly basic aggregate comprising 50 to 75 percent by weight of a hard pitch selected from the group consisting of coal tar pitch and petroleum pitch having a softening point between 110° C. and 180° C. and 50 to 25 percent by weight plasticizer which comprises furfuryl alcohol; furfural; and a member selected from the group consisting of cyclohexanone, mesityl oxide, and mixtures thereof.

2. The binder of claim 1 which includes a strong acid catalyst selected from the group consisting of phosphoric acid, sulfuric acid, hydrochloric acid, and ammonium phosphate.

3. A method for preparing a hard pitch binder which comprises:
   (a) blending 50 to 75 percent by weight of a hard pitch selected from the group consisting of coal tar pitch and petroleum pitch having a softening point between 110° C. and 180° C.; furfural; furfuryl alcohol; and a member selected from the group consisting of cyclohexanone, mesityl oxide, and mixtures thereof; said furfural; said furfuryl alcohol; and said member selected from the group consisting of cyclohexanone, mesityl oxide, and mixtures thereof comprising 50 to 25 percent by weight of the binder; and
   (b) heating the blend to solubilize the hard pitch thereby producing a hard pitch binder which is a liquid at 25° C.

4. The method of claim 3 wherein said heating is at a temperature of at least 60° C. for at least 1 hour.

5. A bonded refractory article comprising an aggregate of refractory particles selected from the group consisting of neutral aggregate, acidic aggregate, and weakly basic aggregate; bonded into an integral shape by a refractory mix comprising a hard pitch binder and a strong acid catalyst selected from the group consisting of phosphoric acid, sulfuric acid, hydrochloric acid, and ammonium phosphate; said hard pitch binder being liquid at 25° C. comprising 50 to 75 percent by weight of a hard pitch selected from the group consisting of coal tar pitch and petroleum pitch having a softening point between 110° C. and 180° C. and 50 to 25 percent by weight plasticizer comprising furfuryl alcohol; furfural; and a member selected from the group consisting of cyclohexanone, mesityl oxide, and mixtures thereof.

References Cited

UNITED STATES PATENTS

| 2,314,181 | 3/1943 | Winterkorn | 260—28 |
| 2,600,403 | 7/1952 | Harvey | 260—64 |
| 2,764,523 | 9/1956 | Cottle et al. | 208—22 X |
| 2,828,275 | 3/1958 | Harvey | 260—42 |
| 2,884,391 | 4/1959 | Winter et al. | 260—28.5 |
| 2,992,136 | 7/1961 | Shipe | 117—132 B |
| 3,201,330 | 8/1965 | Price | 260—28 |
| 3,491,045 | 1/1970 | Metil | 260—28 |
| 3,496,256 | 2/1970 | Boquist | 264—29 |

FOREIGN PATENTS

| 433,826 | 8/1935 | Great Britain | 106—273 |

JOAN B. EVANS, Primary Examiner

U.S. Cl. X.R.

106—273, 279, 280.5; 208—22, 44; 260—28; 264—29, 105; 106—56; 252—510, 511